United States Patent [19]

Wiseman, Sr.

[11] Patent Number: 5,014,357
[45] Date of Patent: May 14, 1991

[54] COVERALL FOR PROTECTION AGAINST STEAM JETS

[75] Inventor: Timothy R. Wiseman, Sr., Richmond, Va.

[73] Assignee: E. I. Du Pont de Nemours and Company, Wilmington, Del.

[21] Appl. No.: 508,838

[22] Filed: Apr. 18, 1990

Related U.S. Application Data

[63] Continuation-in-part of Ser. No. 366,711, Jun. 15, 1989, abandoned.

[51] Int. Cl.$^5$ .............................................. A41D 13/00
[52] U.S. Cl. .................................. 2/81; 2/2; 2/51
[58] Field of Search .......................... 2/81, 51, 2, 2.7; 428/152, 225, 209, 245, 265; 525/432

[56] References Cited

U.S. PATENT DOCUMENTS

| | | | |
|---|---|---|---|
| 3,425,060 | 2/1969 | Glasser et al. | 2/2.1 |
| 3,718,592 | 2/1973 | Prosser | 2/81 |
| 4,034,417 | 7/1977 | Ellis | 2/81 |
| 4,120,914 | 10/1978 | Behnke et al. | 260/857 |
| 4,255,817 | 3/1981 | Heim | 2/2 |
| 4,513,452 | 4/1985 | Rankin, Sr. et al. | 2/81 |
| 4,555,811 | 12/1985 | Shimalla | 2/51 |
| 4,569,088 | 2/1986 | Frankenburg et al. | 2/81 |
| 4,748,065 | 5/1988 | Tanikella | 428/152 |
| 4,750,443 | 6/1988 | Blaustein et al. | 112/420 |
| 4,833,010 | 5/1989 | Langley | 2/2 |
| 4,855,178 | 8/1989 | Langley | 2/2 |
| 4,908,260 | 3/1990 | Dodia et al. | 428/215 |

FOREIGN PATENT DOCUMENTS 2199787  7/1988  United Kingdom ............... 2/2

OTHER PUBLICATIONS

Fyrepel Brochure Entitled "Fire Fighters Protective Clothing".
Body-Guard Brochure Entitled "Body-Guard Apparel-Fire Fighter 3000 Series".
Fyrepel Brochure Entitled "Firefighters Protective Clothing-Over 36 Years of Protection".
Body-Guard Brochure Entitled "Body-Guard Apparel-1971 Series".
Fyrepel Industrial Catalog Entitled "Protective Clothing, Accessories and Supplies".

Primary Examiner—Werner H. Schroeder
Assistant Examiner—Gloria Hale

[57] ABSTRACT

A coverall is provided for protecting its wearer against jets of steam. The coverall comprises an outer shell of a woven fabric of poly(p-phenylene terephthalamide) continuous filament yarns weighing at least about 230 g/m$^2$, laminated on its outer surface to a layer of aluminum. An adjacent insulating inner liner is also provided having, fastened together, an outer and an inner woven fabric between which are multiple fibrous layers and at least one separate film layer.

20 Claims, 3 Drawing Sheets

PAIN CURVE FOR HUMAN TISSUE

1

COVERALL FOR PROTECTION AGAINST STEAM JETS

CROSS REFERENCE TO RELATED APPLICATION

This application is a continuation-in-part of application Ser. No. 07/366,711 filed June 15, 1989, now abandoned.

FIELD OF THE INVENTION

The present invention relates to a coverall garment for protecting its wearer against high pressure jets of steam. More particularly, the invention relates to a protective coverall comprising an outer shell of an aluminized, aramid-fiber woven fabric and a multi-layered, insulating inner liner.

BACKGROUND OF THE INVENTION

Protective coveralls which are effective against a wide variety of hazards are known and commercially available. One such class of coveralls provides protection against flame, radiant heat and contact heat and are useful as fire-entry garments. Another class of coveralls protects against splashes of corrosive liquids, hot liquids, molten metals and the like. Still other coveralls protect against poisonous gases and liquids. However, improvements are needed in known coverall garments to obtain protection against high pressure steam jets. In general, jets of steam supplied at pressures of 1000 kPa or greater almost instantly penetrate currently available, commercial protective garments and cause holes to form in the garments. Such steam jets therefore could inflict serious injury upon the wearer of the known protective garments. Furthermore, in available two-layer protective garments, wherein an inner liner is intended as a thermal barrier between the wearer and the heat source, the liner usually is very heavy and uncomfortable to wear.

Accordingly, it is an object of the present invention to provide a lightweight coverall garment that affords greater protection against high pressure jets of steam than currently available prior art garments.

SUMMARY OF THE INVENTION

The present invention provides a coverall that is particularly suited for protecting its wearer against jets of steam. The coverall comprises a woven fabric of poly(p-phenylene terephthalamide) continuous filament yarns weighing at least about 230 g/m² to which is adhered a layer of aluminum forming the outer surface of the coverall. Optionally, the coverall may further comprise a supplementary heat shield adjacent to the woven fabric, the heat shield comprising a sheet of neoprene rubber stitched to a felt of poly(m-phenylene isophthalamide) staple fibers, the rubber sheet and the felt each weighing from about 300 to about 400 g/m² and the rubber sheet being positioned adjacent the woven fabric.

In a preferred embodiment, the coverall comprises an outer shell and an adjacent insulating inner liner. The outer shell comprises a woven fabric of poly(p-phenylene terephthalamide) continuous filament yarns weighing at least about 230 g/m² to which is adhered a layer of aluminum forming the outer surface of the outer shell. The insulating inner liner comprises an outer woven fabric and an inner woven fabric between which are multiple fibrous layers and at least one separate film layer, the layers of the inner liner being fastened together and weighing from about 300 to about 750 g/m². In use, when the outer surface of the coverall is exposed to saturated steam at 2760 kPa at least 5 seconds are required before the temperature of the inside surface of the inner liner (i.e., skin side surface of the coverall) rises sufficiently for the wearer to perceive pain.

In a more preferred embodiment, the aluminum layer adhered to the woven fabric of the outer shell is a laminate of two continuous aluminum films between which is a layer of polyethylene terephthalate film. weight of the resulting aluminized outer shell is from about 300 to about 400 g/m². The inner and outer woven fabrics of the inner liner comprise yarns of poly(m-phenylene isophthalamide) staple fibers and the multiple fibrous layers comprise at least three spunlaced fabrics of aramid fibers having a total weight of from about 150 to about 400 g/m². At least two separate film layers are adhered to the fibrous layers and the outer woven fabric is separated from the fibrous layers by at least one of the film layers. Preferably, the film layers of the inner liner comprise a breathable liquid-water-impermeable polyetherester and are positioned between the outer woven fabric and the outermost fibrous layer. All the layers of the inner liner are quilted together and have a total weight of from about 300 to about 750 g/m².

In another embodiment, an optional supplementary heat shield is fastened to the outermost surface of the multi-layered inner liner so that it is positioned between the outer shell and inner liner. The supplementary heat shield comprises a sheet of synthetic rubber, most preferably a neoprene rubber, stitched to a felt of poly(m-phenylene isophthalamide) staple fibers, the neoprene rubber sheet and the felt each weighing from about 300 to about 400 g/m². The felt side of the supplementary heat shield is positioned adjacent the outermost surface of the multi-layered inner liner.

BRIEF DESCRIPTION OF THE DRAWINGS

The invention will be better understood by referring to the attached drawings wherein.

DETAILED DESCRIPTION OF THE PREFERRED EMBODIMENTS

Figure 1:
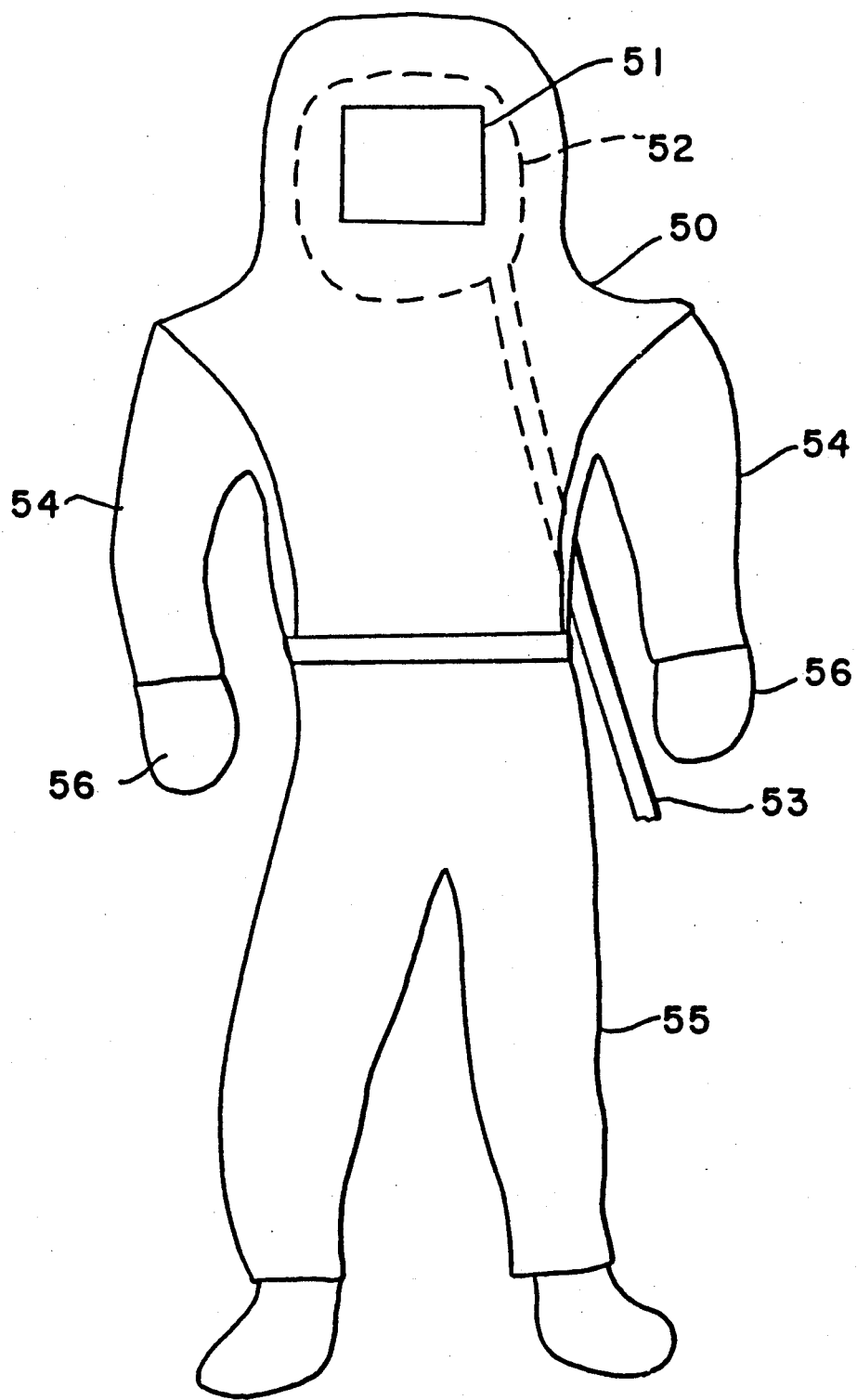
FIG. 1 illustrates a front view of a protective coverall of the invention having a hood with front and back bibs 50 containing a window 51 and a respirator 52 attached to an air supply hose 53. Shirt and arm portions 54, trouser portion 55 and separate, attachable gloves 56 are also provided.
Figure 2:
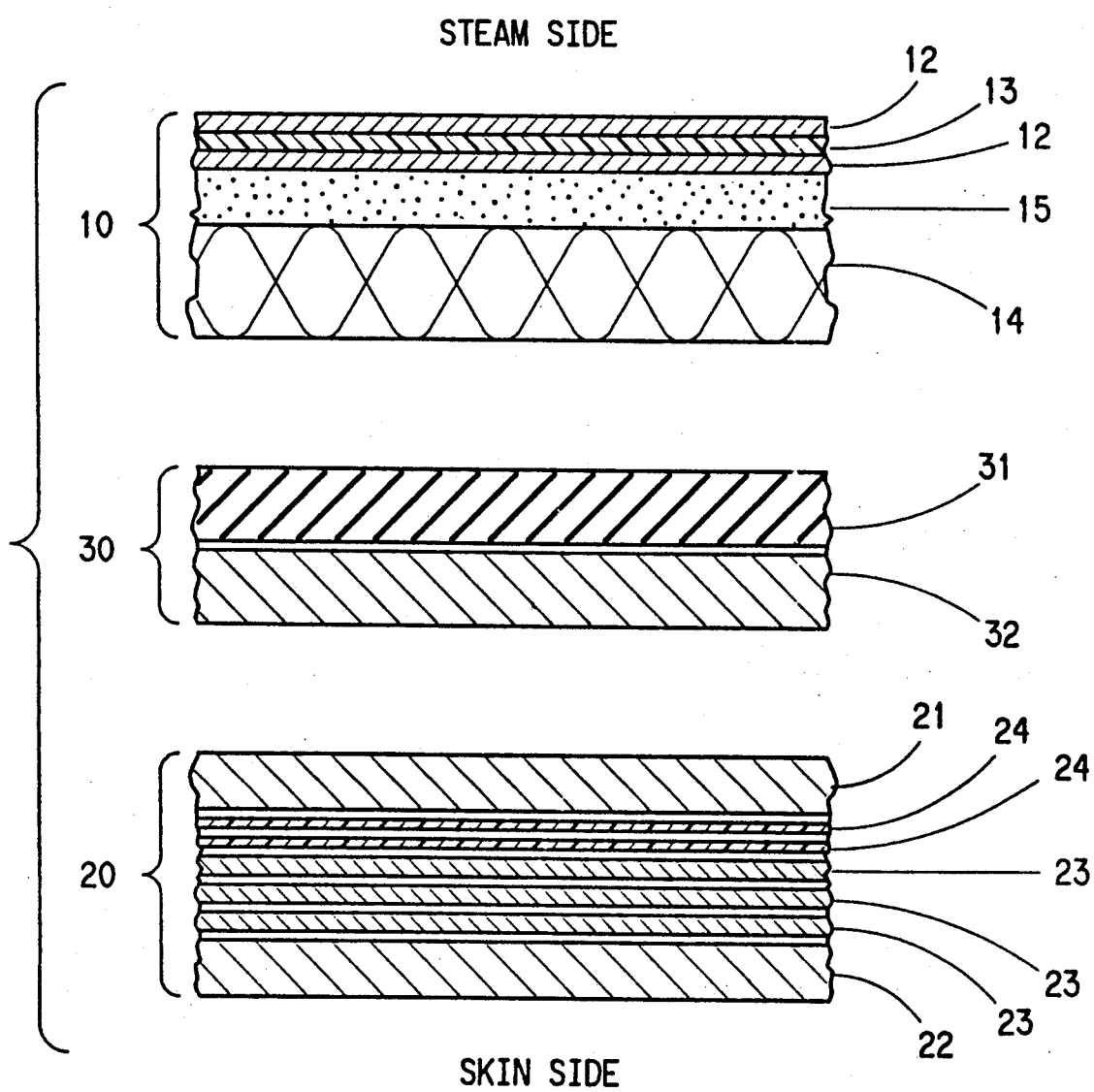
FIG. 2 is a schematic representation in cross-section of a preferred arrangement of the layers of the coverall, showing steam-jet-resistant outer shell 10, insulating inner liner 20 and optionally present supplementary heat shield 30.

In accordance with the present invention, a presently preferred protective coverall is shown in FIG. 2 having an outer shell 10, an insulating inner liner 20, and an optionally present supplementary heat shield 30. The outer shell 10 is constructed in a manner which prevents steam jets from immediately penetrating and destroying the coverall fabric. The outer shell 10 works in cooperation with an inner liner 20 that can be attached or separated from the outer shell. The inner liner 20 provides thermal insulation between the steam-resistant outer shell 10 and the skin of the coverall's wearer.

The steam-jet resistant outer shell 10 comprises a pair of aluminum layers 12 adhered to each other by a film 13, which is preferably polyethylene terephthalate or a polyethylene terephthalate/isothalate copolymer. One of the two aluminum layers is laminated to a woven aramid fabric layer 14, preferably by means of a neoprene-based adhesive 15. The outer aluminum layer forms the outermost surface of the coverall.

The aramid fabric layer 14 of the outer shell is formed from continuous filament yarns of poly(p-phenylene terephthalamide) (referred to herein as "PPD-T") which are woven such that the resulting fabric weighs at least about 230 g/m². Generally, heavy dtex aramid yarns, usually at least 800 dtex and preferably at least 1,000 dtex, are woven tightly into a plain or twill weave fabric. The yarns of the woven fabric are tightly jammed together. Generally, the fabric of the outer shell provides a fabric tightness of at least 0.85, preferably, at least 0.95, and most preferably, at least 0.99.

The insulating inner liner 20 of the coverall of the invention comprises outer and inner woven fabrics 21 and 22 respectively, multiple fibrous nonwoven layers 23, and a pair of thin film layers 24, all fastened together, preferably by quilting stitches (not shown in the drawings). Preferably, at least two film layers 24 are used, although it will be understood that a single film layer can also be used to provide successful protection. The multiple fibrous nonwoven layers 23 of the inner liner number at least three and have a total weight of from about 150 to about 400 g/m². Preferably, each fibrous nonwoven layer 23 comprises a nonapertured spunlaced fabric of aramid staple fibers.

The woven inner and outer fabrics 21 and 22, respectively, of inner liner 20 preferably are formed of yarns of poly(m-phenylene isophthalamide) (referred to herein as "MPD-I") staple fibers. The inner and outer woven fabrics of the inner liner protect the thermal insulating liner from damage during laundering or cleaning.

Also provided between outer and inner woven fabrics 21 and 22 of inner liner 20 are a pair of thin films 24 comprised of a synthetic polymer. Preferably, the two films 24 are adjacent to each other and positioned between outer woven fabric 21 and the outermost fibrous nonwoven layer 23. Preferably, films 24 comprise a terephthalate copolyetherester that is breathable (i.e., permits the slow passage of vapor) but impermeable to liquid water.

The total weight of all of the layers of the inner liner is typically from about 300 to about 750 g/m², preferably from about 350 to about 500 g/m², in order to keep the coverall lightweight.

An especially preferred launderable inner liner 20 has a supplementary heat shield 30 sewn to the outer woven fabric. Heat shield 30 comprises a sheet 31 of synthetic rubber, preferably neoprene, stitched to a felt 32 of MPD-I staple fibers wherein the felt 32 is positioned adjacent the outer woven fabric layer. Sheet 31 typically weighs from about 300 to about 400 g/m². The felt of MPD-I staple fibers is preferably a needle-punched felt which also weighs from about 300 to about 400 g/m². In constructing the inner liner in the form of a garment, the supplementary heat shield 30 is preferably attached to the multi-layered inner liner 20 only in the areas of the chest and inner arms.

The coverall of the invention provides its wearer with added protection against jets of steam. For example, as shown by the steam-jet exposure tests described hereinafter, the fabric of the outer shell is not destroyed by jets of steam of from about 2670 to about 6030 kPa (400 to 875 psi). Also, the coverall provides the wearer with additional seconds of time to escape from the steam jet and avoid being burned. The coverall gives the wearer at least 5 seconds to escape from a jet of saturated steam at 2760 kPa, before such a jet can raise the temperature of the innermost surface of the coverall sufficiently for the wearer to first perceive pain and about another 5 seconds before the wearer would receive a second degree burn.

In the Examples which follow, certain parameters and properties of protective coveralls and their components are reported. These parameters were measured by the following test methods.

Fabric Tightness is determined and calculated as described in *Research Disclosure*, October, 1988, Publication Item No. 29498, "Calculation of Fabric Tightness Factor", pp. 833-6. In determining fabric tightness, the decitex of a yarn is determined by removing the yarn from the fabric, hand extending the yarn to obtain a length of yarn without weave crimp, and then weighing that length to determine its approximate dtex. Then the yarn is loaded to 0.11 g/dtex and the length is remeasured. The remeasured length is used together with the weight of that length of yarn to calculate the dtex used in the formula for fabric tightness.

Steam-Jet- Exposure Testing of a fabric sample is performed in accordance with a modification of the ASTM Designation: F 955-85, "Standard Test Method for Evaluating Heat Transfer Through Materials for Protective Clothing Upon Contact With Molten Substances". A sensor board is constructed as described in the ASTM method, except that the board has only one calorimeter position. In the test, the board is mounted in a horizontal position with the fabric sample clamped over the calorimeter position. A pipe having an inside diameter of 2.66 cm (1.049 in) is mounted vertically 7.5 cm (3 in) above the fabric sample. The pipe is 61-cm (2-feet) long and is connected through an on-off valve to a steam supply pipe of the same diameter. The tester is fitted with means for measuring steam pressure and temperature. In one part of the test, a fabric sample is clamped over the calorimeter position and the sample is subjected to steam, of a given temperature and pressure, jetted from the pipe outlet for a predetermined time period to observe whether the steam has a visible effect on the fabric. In a second part of the test, calorimeter readings are used to determine the degree of protection afforded human tissue covered by a fabric when subjected to steam at a given temperature and pressure. The time required by the calorimeter to record a temperature rise that is equivalent to the temperature rise that would cause a person to perceive pain is measured. It has also been found that the time required for human tissue to experience a second degree burn is about twice the time to perceive pain. Data correlating the calorimeter reading to the perception of pain in human tissue is given in Table 1 of ASTM F 1060-87. The data is reproduced below in Table I and plotted in FIG. 3.

TABLE I

| Temperature Differential | | Seconds to Reach |
|---|---|---|
| °C. | °F. | Perception of Pain |
| 4.74 | 8.53 | 1.0 |
| 5.28 | 9.51 | 1.5 |
| 5.71 | 10.27 | 2.0 |
| 6.22 | 11.20 | 3.0 |
| 7.22 | 13.00 | 5.0 |
| 8.04 | 14.47 | 7.0 |
| 8.74 | 15.73 | 10.0 |
| 11.26 | 20.27 | 20.0 |
| 13.33 | 24.00 | 30.0 |

Figure 3:
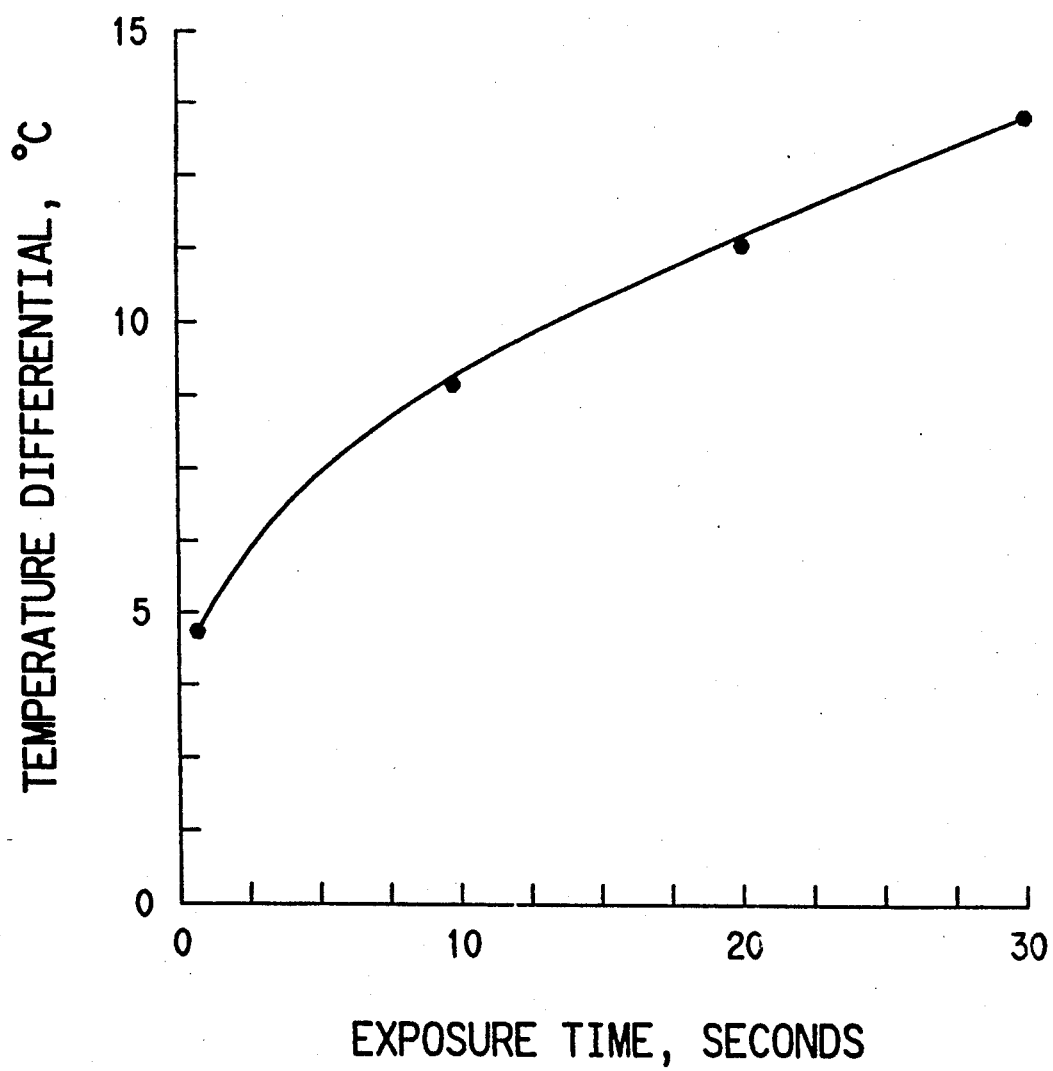
FIG. 3 is a graph of the data that was used for rating the protective value of fabrics in the steam exposure test described hereinafter.

With the test fabric in place, the steam jet valve is opened and calorimeter readings are recorded for temperature differential as a function of exposure time and plotted on a graph having the same scale as FIG. 3. A transparent overlay of the curve of FIG. 3 is used to estimate the protection afforded by the fabric against a steam jet in terms of time until pain is perceived.

EXAMPLES

The invention is further illustrated by the following non-limiting examples of preferred embodiments. These examples are included merely for purposes of illustration and are not intended to limit the scope of the invention. The results reported in these examples are believed to be representative, but do not constitute all test runs involving the indicated components. All percentages in the Examples are by weight, unless stated otherwise.

EXAMPLES 1-3

In Part A of these examples, an outer shell fabric is prepared and shown to have strong resistance to destruction by high pressure steam jets. In Part B of these examples, four different insulating inner liners (i.e., Examples 1A, 1B, 2 and 3) in accordance with the invention are tested in conjunction with the outer liner of Part A for protection against pain and burns. The fabrics of the invention are shown to be much better in protecting a wearer against high pressure steam jets than comparison fabrics that do not have the required construction of the inventive coverall (i.e., comparision samples A(1)–A(3)).

Part A

An aluminized poly(p-phenylene terephthalamide) ("PPD-T") fabric was prepared by firmly adhering an aluminized film having a weight per unit area of 68 g/m$^2$ (2 oz/yd$^2$), comprising a polyethylene terephthalate film having a continuous surface of aluminum on each face, to a plain-weave fabric of continuous filament PPD-T yarn with a neoprene based, heat-resistant adhesive. The PPD-T yarn used to weave the fabric was a commercially available PPD-T continuous filament yarn (available as Type 29 "Kevlar" aramid yarn from E. I. du Pont de Nemours and Co.) of nominal 1100 dtex (1000 denier) and of about 50 Newtons/tex modulus, comprised of individual filaments of 1.65 dtex (1.5 dpf). A sample of the plain-weave fabric was analyzed. It had 12.2 ends per cm by 12.4 picks per cm (31 ends per inch by 31.5 picks per inch) and weighed 281 g/m$^2$ (8.3 oz/yd$^2$). Warp and fill yarns removed from the fabric measured 1101 and 1096 dtex (992 and 987 dpf), respectively. The fabric tightness was calculated to be 0.99. The total weight of the aluminized fabric was 349 g/m$^2$ (10.3 oz/yd$^2$).

The resulting aluminized, plain-weave, PPD-T fabric was cross-sectioned and viewed under a microscope to measure the thicknesses of the various layers. Starting from the outermost surface, the aluminized fabric had in succession (a) a less than 20 micrometer thick layer of aluminum, (b) a less than 20 micrometer thick layer of polyethylene terephthalate film, (c) a second, less than 20 micrometer thick layer of aluminum, (d) a 100 micrometer thick layer of neoprene-based adhesive, and (e) a 380 micrometer thick layer of PPD-T fabric.

The aluminized PPD-T fabric was tested for its suitability as an outer shell in a steam-protective garment by exposing it to a jet of saturated steam at a pressure of 2760 KPa (400 psi) and a temperature of 122° C. (252° F.). In a separate test using another sample, the fabric was exposed to a jet of superheated steam at a pressure of 6030 KPa (875 psi) and a temperature of 468° C. (875° F.). In each test, the fabric sample remained intact, with no holes, no deformation, and no visible mark at the point of steam impingement. In contrast, when fabrics of similar construction (those with non-continuous filament yarns or those having PPD-T fabrics weighing less than 230 g/m$^2$) are steam tested in the same manner, significant damage results in the fabric.

Part B

In this part of these Examples, launderable inner liner fabrics were prepared for testing in conjunction with the aluminized PPD-T outer shell fabric of Part A.

EXAMPLE 1A

A non-apertured, spunlaced nonwoven fabric of 100% PPD-T staple fibers (referred to herein as "the PPD-T nonwoven fabric") weighing 51 g/m$^2$ (1.5 oz/yd$^2$) was prepared substantially as described in Example 4 of U.S. Pat. No. 4,750,443 to Blaustein et al, which description is hereby incorporated herein by reference. Similarly, a spunlaced, nonwoven fabric weighing 92 g/m$^2$: was prepared of 95 weight percent poly(m-phenylene isophthalamide) ("MPD-I") staple fibers and 5% PPD-T fibers ("the MPD-I/PPD-T nonwoven fabric"). A flame-resistant vapor barrier elastomeric film ("the FR film") was prepared substantially as described in Example 5 of U.S. Pat. No. 4,908,260 to Dodia et al from a copolyetherester of 45% 1,4-butylene terephthalate, 33% poly(ethylene oxide) terephthalate, and 22% ethylene oxide/propylene oxide copolyether terephthalate and containing 30% tetradecabromodiphenoxy-benzene. The disclosure of said Example 5 is hereby incorporated herein by reference. The FR film is laminated to the MPD-I/PPD-T nonwoven fabric with 15 g/m$^2$ (0.45 oz/yd$^2$) of fire retardent polyester adhesive in a dot pattern to form a film/fabric laminate weighing 136 g/m$^2$ (4.0 oz/yd$^2$). A commercially available woven pajama check fabric of MPD-I staple fiber yarns ("the MPD-I woven fabric") weighing 109 g/m$^2$ (3.2 oz/yd$^2$) was obtained. A quilt comprising a top layer of the MPD-I woven fabric (identified in the table below as "W"), two layers of the FR film/fabric laminate (each identified below as "F"), three layers of the PPD-T nonwoven fabric (each identified below as "NW"), and an innermost layer of the MPD-I woven fabric was stitched together with 3 g/m: (0.1 oz/yd$^2$) of a MPD-I/PPD-T sewing thread. The total weight of the quilted fabric was 644 g/m$^2$ (19 oz/yd$^2$). The construction of this multi-layered fabric is abbreviated as "W-F-F-NW-NW-NW-W" and designated Example 1A.

The aluminized PPD-T fabric of part A was held in place atop the multi-layered quilted fabric, the aluminum layers forming the outermost layer of the thusly formed structure, and then subjected to steam jet exposure testing, using a jet of saturated steam at a pressure of 4964 KPa (720 psi) and a temperature of 253° C. (487° F.). The calorimeter reading corresponded to reaching a perception of pain after an exposure time of 8 seconds. In this test, the calorimeter position and bolt holes in the sensor board were not carefully sealed to prevent leakage of steam. However, the readings obtained were still in excess of reaching a perception of pain in 5 seconds. In a second test, with the sensor board carefully sealed, the multi-layered fabric designated Example 1A was exposed to a jet of steam at a pressure of 4930 kPa and a temperature of 264° C. The calorimeter readings corresponded to reaching a perception of pain after an exposure time of 13 seconds.

EXAMPLE 1B

Another inner liner fabric was made wIth lhe same construction as the inner liner of Example 1A, except that only one layer of FR film/fabric laminate was used. The liner construction is abbreviated "W-F-NW-NW-NW-W" and designated as Example 1B. When this "single-film" liner was steam tested at 4930 kPa and 264° C. with the sensor board carefully sealed in the same way as Example 1A (see preceding paragraph), the calorimeter reading corresponded to reaching a perception of pain after an exposure time of 10 seconds. The above results are summarized in Table II below.

EXAMPLES 2-3

Results were also obtained using the same test conditions used for Example 1A except with an inner liner constructed with two layers of film/fabric laminate (Example 2) placed below the nonwoven fabrics, just above the bottom woven layer (abbreviated "W-NW-NW-NW-F-F-W") and another inner liner constructed with two film/fabric laminates (Example 3) separating the three nonwoven fabrics (abbreviated "W-NW-F-NW-F-NW-W"). In each test, the aluminized PPD-T fabric of Part A was positioned atop the outer woven ayer of the inner liner. For comparison, three additional inner liners (i.e., A(1)–A(3)) were prepared without any film layers so that the construction of the liner was abbreviated "W-NW-NW-NW-W". One such fabric containing no film was designated Comparison A(1); a comparison sample with a double thickness of fabric A(1) was designated Comparison A(2); and a comparison sample with a quadruple thickness of fabric A(1) was designated Comparison A(3). These samples were tested using the same test conditions used for Example 1A with jets of saturated steam at 253° C. (487° F.) and 313° C. (595° F.). The time required to perceive pain was recorded in seconds. These results are also summarized in Table II below.

TABLE II

| Quilt Construction | | Time (Seconds) | | |
| --- | --- | --- | --- | --- |
| | | 253° C. | 264° C.* | 313° C. |
| Samples | | | | |
| Ex. 1A | W-F-F-NW-NW-NW-W | 8 | 13 | 7 |
| Ex. 1B | W-F-NW-NW-NW-W | — | 10 | — |
| Ex. 2 | W-NW-NW-NW-F-F-W | 6.7 | — | — |
| Ex. 3 | W-NW-F-NW-F-NW-W | 6.5 | — | — |
| Comparisons | | | | |
| A(1) | Single thickness W-NW-NW-NW-W | — | — | <1 |
| A(2) | Double thickness W-NW-NW-NW-W | — | — | 1.5 |
| A(3) | Four thicknesses W-NW-NW-NW-W | — | — | 2.2 |

*Sensor board carefully sealed

EXAMPLE 4

Outer shell fabrics similar to the plain-weave PPD-T fabric prepared in Part A of Examples 1–3 were made from the same nominal 1100 dtex PPD-T continuous filament yarn woven into plain-weave fabrics, except that fewer yarns per cm were used in both the warp and in the fill, so that the fabrics had a lower basis weight. The first fabric had a construction of 11.8 ends per cm (30 ends per inch) by 11.8 picks per cm (30 picks per inch) and had a basis weight of 271 g/m$^2$ (8.0 oz/yd$^2$) and a fabric tightness of 0.96. The second fabric had a construction of 11.0 ends per cm (28 ends per inch) by 11.0 picks per cm (28 picks per inch), a basis weight of 254 g/m$^2$ (7.5 oz/yd$^2$), and a fabric tightness of 0.92. The third fabric had a construction of 10.2 ends per cm (26 ends per inch) by 10.2 picks per cm (26 picks per inch), a basis weight of 237 g/m$^2$ (7.0 oz/yd$^2$), and a fabric tightness of 0.87. These fabrics were aluminized in the same way as in Part A of Examples 1–3, thereby adding 68 g/m$^2$ to the basis weight of the fabrics. The three aluminized PPD-T fabrics were tested for suitability as outer shells for steam-protective garments by exposing them to jets of steam at a pressure of 4895 kPa (710 psi) and a temperature of 264° C. (507° F.). In each test, the fabric sample remained intact, with no holes, no deformation, and no visible mark at the point of steam impingement.

The inner liner of Part B of Example 1A was then tested in conjunction with the third of the above-identified outer shell fabrics (made from the plain weave fabric having a construction of 10.2 ends per cm × 10.2 picks per cm), exposing it to a jet of steam at a pressure of 4895 kPa (710 psi) and a temperature of 264° C. (507° F.), the test procedure otherwise being the same as in Part B of Example 1A. The calorimeter reading corresponded to reaching a perception of pain after an exposure time of 6 seconds. As noted above and in Table II, when the inner liner of Part B of Example 1A was tested with the outer shell of Part A of Examples 1–3 under the same conditions (steam at a pressure of 4895 kPa and a temperature of 264° C.), the calorimeter reading corresponded to reaching a perception of pain after an exposure time of 10 seconds.

In addition, another outer shell fabric similar to the plain-weave PPD-T fabric used in Part A of Examples 1–3 was prepared from the same nominal 1100 dtex PPD-T continuous filament yarn woven into a plain-weave fabric, except that the fabric had a construction of only 9.5 ends per cm (24 ends per inch) by 9.5 picks per cm (24 picks per inch) and had a basis weight of only 219 g/m$^2$ and a fabric tightness of only 0.82. The fabric was aluminized in the same way as in Part A of Examples 1–3, thereby adding 68 g/m$^2$ to the basis weight of the fabric. When this fabric was tested for suitability as an outer shell for steam-protective coverall garments, by exposIng it to a jet of steam at a pressure of 4895 kPa (710 psi) and a temperature of 264° C. (507° F.), the fabric failed. Failure occurred when the continuous filaments seperated and a hole opened through the aluminum layer. Further, when the inner liner of Part B of Example 1A was tested in conjunction with this outer shell fabric (made from the plain weave fabric having a construction of 9.5 ends per cm×9.5 picks per cm), the fabric failed again after exposing it to a jet of steam at a pressure of 4895 kPa (710 psi) and a temperature of 264° C. (507° F.). In this test, with the procedure otherwise being the same as in Part B of Example 1A, the calorimeter reading corresponded to reaching a perception of pain after an exposure time of only 3 seconds.

EXAMPLE 5

Outer shell fabrics similar to the plain-weave PPD-T fabric prepared in Part A of Examples 1-3 and the plain-weave fabrics in Example 4 were made from nominal 1100 dtex PPD-T continuous filament yarns, except that twill constructions were woven from the yarns. In each case, a construction of 11.8 ends per cm (30 ends per inch) by 11.8 picks per cm (30 picks per inch) was woven and the basis weight was about 271 g/m$^2$ (8.0 oz/yd$^2$). One of the fabrics woven was a 2×1 twill and the other was a 3×1 twill. These fabrics were aluminized in the same way as in Part A of Examples 1-3, thereby adding 68 g/m$^2$ to the basis weight of the fabrics.

The aluminized 2×1 and 3×1 twill fabrics were tested for suitability as outer shells for coverall garments by exposing them to jets of steam at a pressure of 4895 kPa (710 psi) and a temperature of 264° C. (507° F.). In each test, the fabric sample remained intact, with no deformation, no holes, and no visible mark at the point of steam impingement.

The inner liner of Part B of Example 1A was then tested in conjunction with each of the two aluminized twill fabrics, exposing them to a jet of steam at a pressure of 4895 kPa (710 psi) and a temperature of 264° C. (507° F.), the test procedure otherwise being the same as in Part B of Example 1A. In each case, the calorimeter reading corresponded to reaching a perception of pain after an exposure time of 10.2 seconds.

EXAMPLE 6

This example illustrates the invention with an inner liner that has an optionally present supplementary heat shield fastened to its outer woven fabric. The supplementary heat shield is shown to add significant protection against steam jets.

A launderable inner liner for use with the aluminized PPD-T fabric of Part A of Examples 1-3 as an outer shell was prepared by stitching together a sheet of neoprene synthetic rubber weighing 339 g/m$^2$ (10 oz/yd$^2$) and a needle-punched felt of MPD-I staple fibers weighing 339 g/m$^2$ to make a supplementary heat shield, and then sewing the supplementary heat shield to an insulating inner liner having the construction of the liner fabric of Example 1A, namely "W-F-F-NW-NW-NW-W". The supplementary heat shield was positioned atop the outer woven fabric layer (i.e., the woven fabric next to the two film layers) with the felt side adjacent the outer woven fabric layer. Steam jet tests were performed as in the preceding Examples with the outer shell of Part A of Examples 1-3 and a saturated steam temperature of 253° C.. Without the heat shield in place (as in Example 1A), the exposure time necessary to reach the perception-of-pain level was 8 seconds. With the heat shield in place, the exposure time was increased to 10 seconds and the exposure time until burns begin to about 15 seconds.

Although particular embodiments of the present invention have been set forth in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the present invention.

I claim:

1. A coverall, particularly suited for protecting its wearer against jets of steam, comprising a woven fabric of poly(p-phenylene terephthalamide) continuous filament yarns weighing at least 230 g/m$^2$, the fabric being adhered to a layer of aluminum which forms the outer surface of the coverall.

2. A coverall according to claim 1 wherein the aluminum layer adhered to the woven fabric is a laminate of two continuous aluminum films between which is a layer of polyethylene terephthalate film.

3. A coverall according to claim 1 wherein the total weight of the woven fabric and layer of aluminum is from 300 to 400 g/m$^2$.

4. A coverall according to claim 1 wherein the fabric is woven into a plain weave.

5. A coverall according to claim 4 wherein the continuous filament yarns are woven into a plain weave fabric and provide a fabric tightness of at least 0.85.

6. A coverall according to claim 4 wherein the continuous filament yarns are woven into a plain weave fabric and provide a fabric tightness of at least 0.95.

7. A coverall according to claim 4 wherein the continuous filament yarns are woven into a plain weave fabric and provide a fabric tightness of at least 0.99.

8. A coverall according to claim 1 further comprising a supplementary heat shield adjacent to the inner surface of the coverall, the supplementary heat shield comprising a sheet of neoprene rubber stitched to a felt of poly(m-phenylene isophthalamide) staple fibers, the rubber sheet and the felt each weighing from 300 to 400 g/m$^2$ and the rubber sheet being positioned adjacent the inner surface of the coverall.

9. A coverall, particularly suited for protecting its wearer against jets of steam, comprising an outer shell and an adjacent insulating inner liner:

the outer shell comprising a woven fabric of poly(p-phenylene terephtalamide) continuous filament yarns weighing at least about 230 g/m$^2$ the fabric being adhered to a layer of aluminum which forms the outer surface of the outer shell; and the insulating inner liner comprising an outer woven fabric and an inner woven fabric between which are multiple fibrous layers and at least one separate film layer, the layers of the inner liner being fastened together and having a total weight of from 300 to 750 g/m$^2$.

10. A coverall according to claim 9 wherein the aluminum layer adhered to the woven fabric of the outer shell is a laminate of two continuous aluminum films between which is a layer of polyethylene terephthalate film, and the inner and outer woven fabrics of the inner liner are of yarns of poly(m-phenylene isophthalamide) staple fibers, the multiple fibrous layers comprise at least three spunlaced fabrics of aramid fibers having a total weight of from 150 to 400 g/m², the outer woven fabric being separated from the multiple fibrous layers by at least one film layer, all the layers of the inner liner being quilted together.

11. A coverall according to claim 9 wherein the total weight of the outer shell is from 300 to 400 g/m².

12. A coverall according to claim 9 wherein the outer shell fabric is woven into a plain weave.

13. A coverall according to claim 10 wherein at least two separate film layers are provided between the outer woven fabric and the inner woven fabric of the inner liner.

14. A coverall according to claim 13 wherein each separate film layer of the inner liner comprises a breathable, liquid-water-impermeable polyetherester film that is adhered to the outermost fibrous layer and provided between the outer woven fabric and the fibrous layers of the inner liner.

15. A coverall according to claim 12 wherein the continuous filament yarns are woven into a plain weave fabric and provide a fabric tightness of at least 0.85.

16. A coverall according to claim 12 wherein the continuous filament yarns are woven into a plain weave fabric and provide a fabric tightness of at least 0.95.

17. A coverall according to claim 12 wherein the continuous filament yarns are woven into a plain weave fabric and provide a fabric tightness of at least 0.99.

18. A coverall according to claim 9 further comprising a supplementary heat shield fastened to the outer woven fabric of the inner liner, the supplementary heat shield comprising a sheet of neoprene rubber stitched to a felt of poly(m-phenylene isophthalamide) staple fibers, the rubber sheet and the felt each weighing from 300 to 400 g/m² and the felt being adjacent to the outer woven fabric.

19. A coverall according to claim 1 wherein the fabric is woven into a twill weave.

20. A coverall according to claim 9 wherein the fabric is woven into a twill weave.

* * * * *